US009730271B2

(12) United States Patent
Diab et al.

(10) Patent No.: US 9,730,271 B2
(45) Date of Patent: Aug. 8, 2017

(54) SYSTEMS AND METHODS FOR SPLITTING AND RECOMBINING COMMUNICATIONS IN MULTI-NETWORK ENVIRONMENTS

(71) Applicant: Avago Technologies General IP (Singapore) Pte. Ltd., Singapore (SG)

(72) Inventors: Wael Diab, Irvine, CA (US); John Walley, Ladera Ranch, CA (US); Kamlesh Rath, San Ramon, CA (US); Raymond Hayes, Los Gatos, CA (US); Murat Mese, Rancho Palos Verdes, CA (US); Souman Chakraborty, Bangalore (IN); Pavan Nuggehalli, Mountain View, CA (US); Rishi Ranjan, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 14 days.

(21) Appl. No.: 14/295,291

(22) Filed: Jun. 3, 2014

(65) Prior Publication Data
US 2014/0355522 A1 Dec. 4, 2014

Related U.S. Application Data

(60) Provisional application No. 61/979,467, filed on Apr. 14, 2014, provisional application No. 61/830,567, filed on Jun. 3, 2013.

(51) Int. Cl.
*H04W 88/06* (2009.01)
*H04W 40/02* (2009.01)
*H04W 76/02* (2009.01)

(52) U.S. Cl.
CPC ......... *H04W 88/06* (2013.01); *H04W 76/026* (2013.01); *H04W 40/02* (2013.01); *Y02B 60/50* (2013.01)

(58) Field of Classification Search
CPC ......... H04W 36/0022; H04W 36/0066; H04W 36/0083; H04W 36/0088; H04W 36/30;
(Continued)

(56) References Cited

U.S. PATENT DOCUMENTS

| 8,284,717 B2 * | 10/2012 | Voyer | H04L 45/24 370/328 |
| 8,396,472 B2 * | 3/2013 | Worrall | H04L 69/18 370/338 |

(Continued)

FOREIGN PATENT DOCUMENTS

| CN | 102355694 A * | 2/2012 |
| CN | 102595509 A * | 7/2012 |

(Continued)

OTHER PUBLICATIONS

Li et al., GreenTube: power optimization for mobile videostreaming via dynamic cache management, Nov. 2, 2012, MM '12 Proceedings of the 20th ACM international conference on Multimedia, pp. 279-288.*

(Continued)

*Primary Examiner* — Michael Thier
*Assistant Examiner* — Eric Nowlin
(74) *Attorney, Agent, or Firm* — Sterne, Kessler, Goldstein & Fox P.L.L.C.

(57) ABSTRACT

Systems and methods for providing dynamic substream definition and handover are provided. In embodiments, a user device includes a multiple radio access technology (RAT) communications modules and a communication controller. Each RAT communication module is further configured to communicate using a different RAT. The user device identifies available networks for communication. Then, the controller determines whether a need to split a communications stream exists (e.g., the user device is engaged in a
(Continued)

bandwidth intensive application). If the communications stream is to be split, the controller defines the substreams (either equally or unequally) and assigns a first substream to a communication pathway in a first available network and assigns a second substream to a communication pathway in a second available network. The destination then recombines the substreams. In embodiments, the controller inserts synchronization in the substreams.

18 Claims, 4 Drawing Sheets

(58) Field of Classification Search
CPC ............ H04W 40/02; H04W 72/1215; H04W 76/025; H04W 76/026; H04W 88/06; H04W 88/10; H04W 88/12; H04W 16/14; H04W 28/20; H04B 17/318; H04L 5/0001; H04L 43/0882; H04L 45/24; H04L 45/245; H04L 47/41
See application file for complete search history.

(56) References Cited

U.S. PATENT DOCUMENTS

| | | | | |
|---|---|---|---|---|
| 8,514,865 | B2* | 8/2013 | Sharma | H04L 12/2874 370/395.42 |
| 8,566,455 | B1* | 10/2013 | Zhao | H04W 76/025 709/227 |
| 8,848,701 | B2* | 9/2014 | Rados | H04W 48/18 370/277 |
| 2002/0080888 | A1* | 6/2002 | Shu | G06F 11/1076 375/295 |
| 2002/0120874 | A1* | 8/2002 | Shu | G06F 11/1076 726/26 |
| 2006/0129630 | A1* | 6/2006 | Catalina-Gallego | H04L 29/12311 709/203 |
| 2006/0193295 | A1* | 8/2006 | White | H04L 12/5692 370/336 |
| 2007/0014260 | A1* | 1/2007 | Seo | H04W 36/14 370/331 |
| 2007/0153729 | A1 | 7/2007 | Alapuranen | |
| 2008/0311855 | A1* | 12/2008 | Manousakis | H04W 28/06 455/67.11 |
| 2009/0253433 | A1* | 10/2009 | Voyer | H04L 45/24 455/436 |
| 2010/0062760 | A1* | 3/2010 | Fuccellaro | H04W 48/18 455/426.1 |
| 2010/0202394 | A1* | 8/2010 | Zhang | H04W 52/34 370/329 |
| 2011/0158117 | A1* | 6/2011 | Ho | H04W 52/34 370/252 |
| 2012/0082046 | A1* | 4/2012 | Ho | H04W 52/367 370/252 |
| 2012/0188873 | A1* | 7/2012 | Nakatsugawa | H04L 1/0003 370/231 |
| 2012/0188949 | A1* | 7/2012 | Salkintzis | H04L 45/308 370/329 |
| 2013/0182601 | A1* | 7/2013 | Bandyopadhyay | H04L 45/245 370/252 |
| 2013/0268628 | A1* | 10/2013 | Zhu | H04W 52/04 709/217 |
| 2014/0154973 | A1* | 6/2014 | Schoppmeier | H04W 88/06 455/39 |
| 2014/0313989 | A1* | 10/2014 | Doken | H04L 65/605 370/329 |
| 2014/0369329 | A1* | 12/2014 | Lee | H04W 28/06 370/338 |
| 2015/0372872 | A1* | 12/2015 | Bandyopadhyay | H04L 41/0896 370/252 |
| 2016/0057687 | A1* | 2/2016 | Horn | H04W 24/10 370/331 |
| 2016/0277957 | A1* | 9/2016 | Patel | H04W 28/0221 |

FOREIGN PATENT DOCUMENTS

| | | | | |
|---|---|---|---|---|
| CN | 102711184 A | * | 10/2012 | |
| CN | WO 2012163260 A1 | * | 12/2012 | ............ H04W 28/10 |
| DE | 102004049705 A1 | * | 4/2006 | ......... H04L 12/5692 |

OTHER PUBLICATIONS

Bui et al., GreenBag: Energy-Efficient Bandwidth Aggregation for Real-Time Streaming in Heterogeneous Mobile Wireless Networks, Dec. 6, 2013, 2013 IEEE 34th Real-Time Systems Symposium (RTSS), p. 57-67.*
Hsieh et al., A Transport Layer Approach for Achieving Aggregate Bandwidths on Multi-Homed Mobile Hosts, Sep. 28, 2002, MobiCom '02 Proceedings of the 8th annual international conference on Mobile computing and networking, pp. 83-94.*
Chebrolu et al., "Bandwidth Aggregation for Real-time Applications in Heterogeneous Wireless Networks," Apr. 2006, IEEE Trans. Mobile Comput., vol. 5, No. 4, pp. 388-403.*
Panahi et al., A Novel Schema for Multipath Video Transferring Over Ad Hoc Networks, Oct. 4, 2008, Ubicomm 2008: The Second International Conference on Mobile Ubiquitous Computing, Systems, Services and Technologies, pp. 77-82.*
Mao et al., Multipath Video Transport Over Ad Hoc Networks, Aug. 2005, IEEE Wireless Communications, p. 42-49.*
Habak et al., G-DBAS: A Green and Deployable Bandwidth Aggregation System, Apr. 4, 2012, 2012 IEEE Wireless Communications and Networking Conference (WCNC), pp. 3290-3295.*
Sharma et al., Handheld Routers: Intelligent Bandwidth Aggregation for Mobile Collaborative Communities, 2004, IEEE Proceedings of the First International Conference on Broadband Networks (BROADNETS'04).*
Luo et al., Investigation of radio resource scheduling in WLANs coupled with 3G cellular network, Jun. 20, 2003, IEEE Communications Magazine, vol. 41, pp. 108-115.*
European Office Action from the European Patent Office, Rijswijk, Netherlands, directed to related EP Application No. 15161588.7, dated Jan. 19, 2017; 6 pages.

* cited by examiner

SYSTEMS AND METHODS FOR SPLITTING AND RECOMBINING COMMUNICATIONS IN MULTI-NETWORK ENVIRONMENTS

CROSS REFERENCE TO RELATED APPLICATIONS

This application claims the benefit of U.S. Provisional Patent Application No. 61/830,567, filed Jun. 3, 2013, and U.S. Provisional Patent Application No. 61/979,467, filed Apr. 14, 2014, each of which is incorporated by reference herein in its entirety.

FIELD OF THE INVENTION

This application relates generally to wireless networks including handovers between networks using different radio access technologies.

BACKGROUND

Wireless technologies have become an integral part of communications used by individuals. Traditional cellular networks have evolved to provide both voice and data services to users. In addition, networks such as wireless LAN (e.g., 802.11) networks and WiMAX (e.g., 802.16e) networks have emerged to provide wireless connectivity to data networks such as the Internet. Because of the increased availability of multiple types of wireless networks, user devices have been developed to work on multiple types of wireless networks.

Cellular networks (e.g., 3G, 4G, LTE networks) typically have larger coverage areas than wireless data networks (820.11). Therefore, in some areas, a user may only be able to access and utilize voice and data services through a cellular network. However, when a user enters an area covered by multiple networks (e.g., 3G, 4G, LTE, 802.11), the device must select a single network for communications. For certain types of applications, it may be beneficial to communicate using multiple networks simultaneously.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

With the increase in usage of wireless user devices, efforts to efficiently use available bandwidth have become a critical consideration. Embodiments of the present disclosure optimize bandwidth usage within multiple networks by splitting communication streams when it would be efficient to take advantage of bandwidth in multiple networks.

Figure 1:
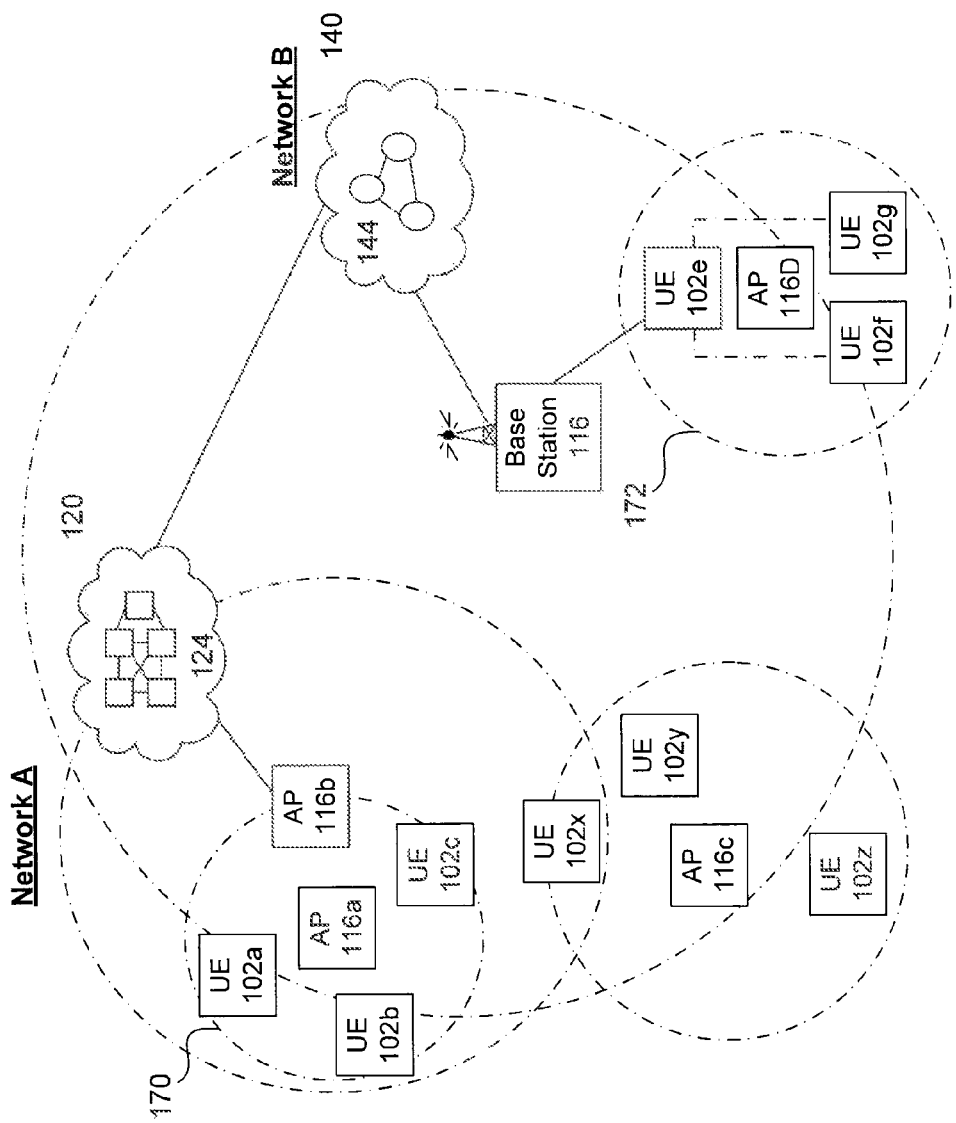
FIG. 1 depicts an exemplary operating environment for a method for peer-to-peer connectivity and handover, according to embodiments of the present invention.

FIG. 1 depicts an exemplary operating environment 100 for a method for network communication handover, according to embodiments of the present invention. Exemplary operating environment 100 includes multiple networks. For ease of discussion, two networks—Network A and Network B are illustrated in FIG. 1. Network A includes a core network 120 having a plurality of switching or routing elements 124. Network B also includes a core network 140 having a plurality of switching or routing elements 144.

In an embodiment, each network can use a different radio access technology (RAT) for communication between a user device and the network access device (e.g., base station, evolved NodeB (eNB) or access point) over the air interface. A RAT is typically directed to certain types of traffic. For example, CDMA, FDMA, OFDMA, GSM are directed to voice traffic and 802.11 and 802.16(e) are directed to data traffic. In another embodiment, each network can use the same RAT. In another embodiment, some of the networks use different RATs. A user device connects to network A or B through a network access interface device.

In embodiments, Network A is a wireless data network such as a network based on the 802.11 standard. A user device, also referred to as a UE, accesses network A via an access point such as access points (AP) 116a-c. Network B may be an LTE network. A UE therefore access network B via a base station 146 or eNB (not shown).

A UE can access multiple networks at the same time, depending on the location of the user device. A controller in the user device can be configured to connect to more than one network simultaneously. The controller can also be configured to split an outgoing communication stream into multiple substreams, as described in more detail below.

As illustrated in FIG. 1, a set of user devices may often be in proximity of multiple networks. As described in further detail in the embodiments below, a controller it a user device can be configured to split a communication stream into a plurality of substreams. In embodiments, these substreams can be communicated using multiple networks accessible to the user device.

A UE 102 may be any wireless device such as a mobile phone, laptop, PDA, etc. In embodiments, UE 102 supports multiple RATs (e.g., CDMA, 802.11, GSM and/or WLAN). When UE 102 travels between coverage areas, a full or partial handover can occur. During a full or partial handover (also referred to as a handoff), a wireless device can split an outgoing communication stream between its primary association with the current serving network access device (e.g., base station or access point) to include one or more additional network access devices. In an embodiment, elements within a network can split a communication stream, performing full or partial handover. A handover may be triggered by a variety of factors such as an efficiently communicating different data types, a decrease in link quality, or network loading.

Figure 2:
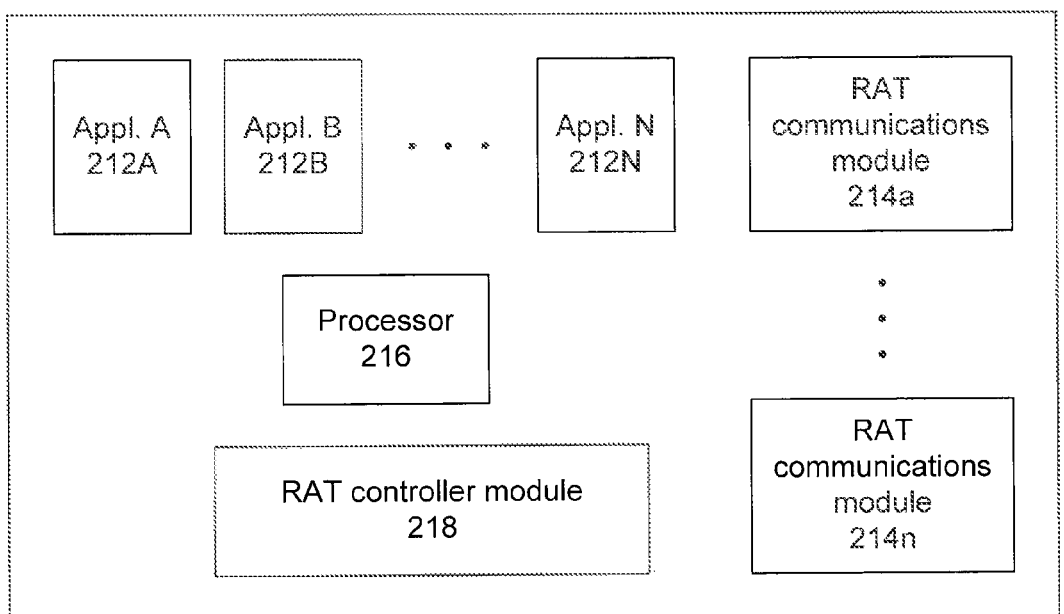
FIG. 2 depicts an exemplary UE, according to embodiments of the present disclosure.

FIG. 2 depicts an exemplary network device 202, according to embodiments of the present disclosure. For example, network device 202 can be a UE or a node within a network. Network device 202 is a multi-RAT device. Therefore, the network device includes at least two RAT communications modules 214. Each RAT module 214 is configured to support a specific radio access technology. For example, RAT module 214a-n may support a cellular protocol such as CDMA, OFDMA, or GSM. One or more RAT modules 214a-n may support the same network protocol.

Network device 202 further includes a processor 216 configured to execute one or more applications 212. Applications 212 may include, for example, e-mail, a video player, an audio player, games, etc.

Network device 202 also includes a RAT controller module 218. In an embodiment, RAT controller module 218 is configured to manage communication, connectivity, and processing for network device 202 when network device 202 is utilized in a multi-network arrangement. Additional details of RAT controller module 218 are described relative to the embodiments below.

Establishing Multiple Simultaneous Substreams

As described above, a UE can execute multiple applications. For example, a UE may run application to download files, play games, and/or stream videos. When a network device has access to multiple networks simultaneously, the network device can be configured to split a communication stream for an application into a plurality of substreams and communicate each substream over a different network.

Figure 3:
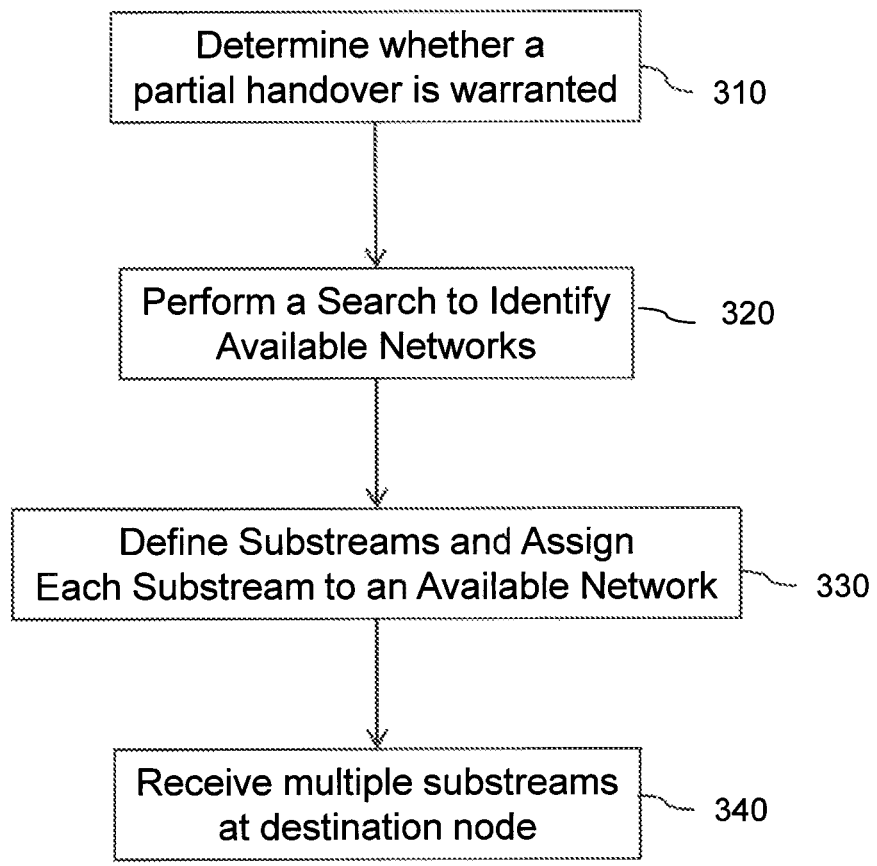
FIG. 3 depicts a flowchart of a method for splitting a communication stream to communicate over two or more networks, according to embodiments of the present disclosure.

FIG. 3 depicts a flowchart 300 of a method for handing over one or more portions of one or more outbound communication streams, according to embodiments of the present disclosure. Flowchart 300 is described with continual reference to the embodiments described in FIGS. 1 and 2. However, flowchart 300 is not limited to those embodiments. Although FIG. 3 describes a single instance of splitting a stream, as would be appreciated by a person of ordinary skill in the art, multiple simultaneous substreams can be created within the network itself between two nodes (i.e., communication streams can be split and recombined within the network itself, sometimes more than once).

In step 310, a controller in the UE such as RAT controller module 218 determines whether a partial handover is warranted. For example, a UE may currently be accessing a network via a network access device using a specific RAT (e.g., a cellular RAT). Based on the applications currently being executed on the UE and actively communicating with the network, the controller determines whether to hand over a portion of the stream or communication exchange from the current network to a different network. For example, the controller may take into account application demand, general and adaptive load balancing for the UE, and/or link availability when making the decision. If a partial handover is warranted, processing proceeds to step 320. If a partial handover is not warranted, processing remains at step 310.

For example, when a network device determines that it needs or will need additional communication bandwidth, it may seek out and identify additional networks it can communicate with. In an embodiment, the network device can determine this based on the throughput of the currently available networks or based on the quality of service (QoS) being offered on one or more networks. For example, a network device may be using LTE to participate in a video chat, but because of additional users, the bandwidth may be reduced to a point where the quality is being affected. In this example, the network device may be configured to determine if there is an additional network that can be used to boost the network device's available bandwidth.

In step 320, the UE device performs a search to identify available networks. For example, the UE may determine that multiple networks (e.g., cellular and/or 802.11 networks) are available to serve the UE.

In step 330, the controller in the UE defines the substreams and assigns each substream to an available network. In embodiments, the controller may define each substream the same as all others. In an alternate embodiment, described, the controller defines each substream unequally.

The substream definition process may take into account a number of factors such as the type of underlying communication pathways available and the quality and/or throughput of each pathway. For example, a single stream may be broken down into ratios that fit within the available throughput of each path (e.g., a WiFi path and an LTE path). The substream definition process may also take into account the importance of the data being transmitted. For example, the more important bits can be grouped into a substream and the less important bits can be grouped into a second substream. Handover can then be coordinated independently for each substream. The controller can assign a substream to the appropriate pathway. For example, the important bits can be transmitted over a higher reliability, higher QoS, higher throughput, or lower latency pathway whereas the less important bits can be transmitted over a different pathway.

In a video example, the controller may divide a video stream into a first substream having I-Frame data and a second substream having P/B Frame data. In another example, video game data, that requires higher QoS and reliability, may be transferred via the first network, and additional game data (like text chatting), that requires lower QoS or reliability, may be transferred via the second network.

In step 340, the destination node receives the multiple substreams. In embodiments, the destination node receives the multiple substreams via different pathways. In alternate embodiments, the destination node receives the substreams via a single pathway. In this embodiment, a handover of one or more pathways occurs in the network.

In an embodiment, when data is split as discussed above, queuing delays can be mitigated by adjusting the playback speed at the destination to allow data from multiple networks to be arrive at a destination. In another embodiment, data from received via one network may not need to be synchronized with data being transmitted on another network, for example associates video and text data, allowing for improved user experience.

Multiple Substreams Synchronization

In order to communicate a single outbound communication stream via multiple networks, a network device, e.g., a UE, must synchronize the information being communicated on each network. As described in more detail below, synchronization can happen when information is being communicated, or as part of the initialization of the multiple communication streams.

Figure 4:
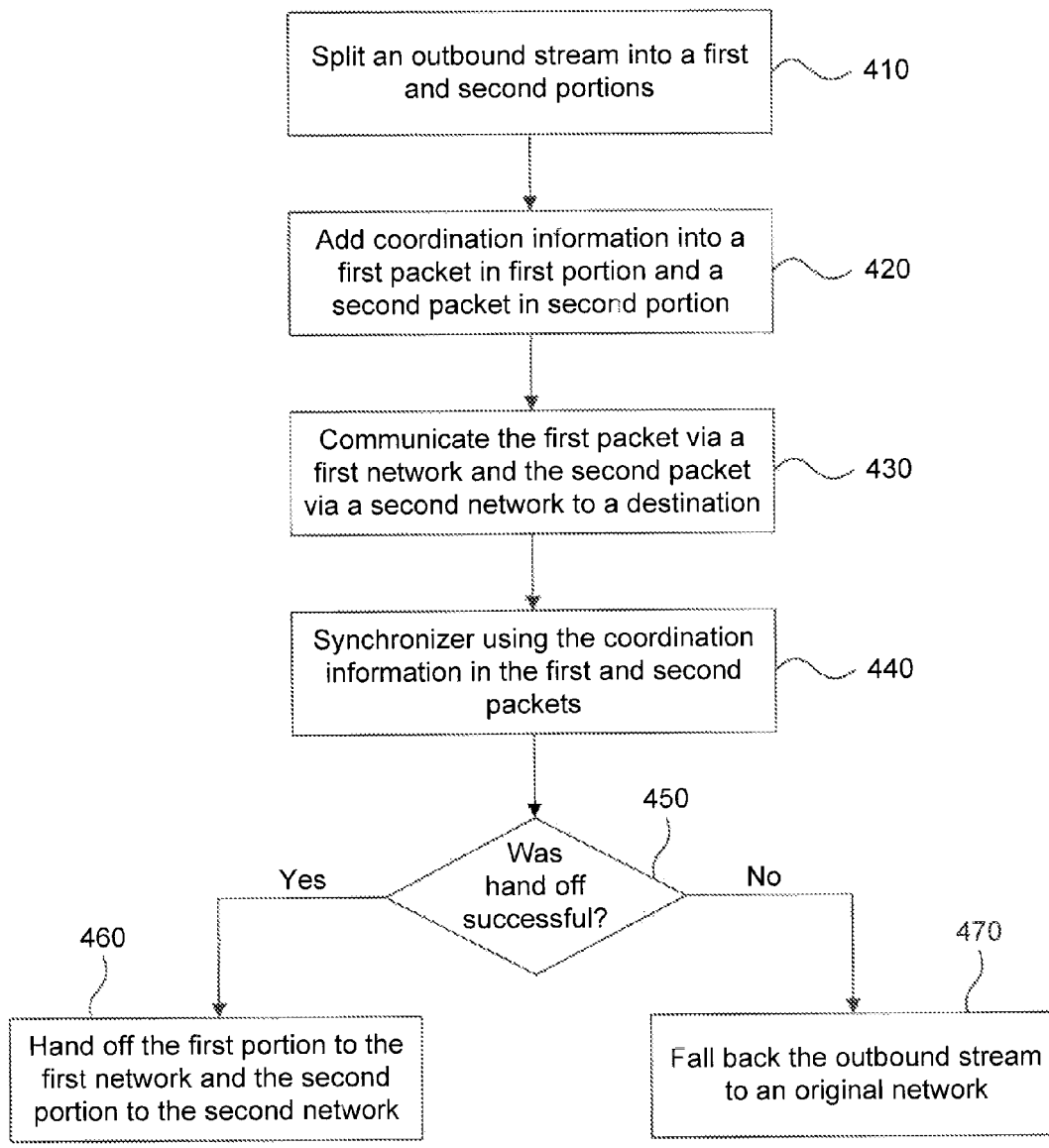
FIG. 4 depicts a flowchart of a method for coordinating multiple portions of a split communication, according to embodiments of the present disclosure.

FIG. 4 depicts a flowchart 400 of a method for coordinating communication using multiple communication paths where each path is communicating a portion of a communication stream or exchange. Flowchart 400 is described with continual reference to the embodiments described in FIGS. 1 and 2. However, flowchart 400 is not limited to those embodiments.

In step 410, a wireless communication controller can be configured to split a single outgoing communication stream into a first portion and a second portion.

In step 420, the wireless communication controller can be configured to add synchronization information into a first substream and into a second substream. In an embodiment, the synchronization information can include a sequence number (i.e., indicating the order in which the packets should be arranged when combined), a time stamp (e.g., indicating when the packet was send from RAT controller module 218), or other information useful to coordinate the communication of packets over multiple networks.

In an embodiment, synchronization information can be generated by the physical layer of the network device transmitting the packets, for example by RAT communication modules 214a-n illustrated in FIG. 2. In an embodiment, both timestamp information from the physical layer of the network device transmitting the packet and sequence number information from the wireless communication controller splitting the single outgoing communication stream are included in the synchronization information. This allows for corrections to packet ordering where the timestamp of one physical layer may not be as accurate as the timestamp in the second physical layer. For example, the timestamps may diverge enough that the second substream appears to have been sent ahead of the first substream, when in reality the first substream was sent first. In another example, the timestamp of one of the networks may not contain enough information to indicate the order of the packets, e.g., the timestamp in one network may indicate the time to the nearest second and the timestamp in another network may indicate the time to the nearest microsecond. In either example, the entity receiving the substreams can use the sequence numbers to correctly order the received data.

In step 430, the first and second substreams can be transmitted by a first and second network. For example, the first substream can be transmitted by a WiFi network and the second packet can be transmitted by an LTE network. As discussed above, the networks transmitting the substreams can be use different network standards, the same network standard, or a combination thereof.

In step 440, the synchronization information is verified. In an embodiment, this can be accomplished by the entity receiving the portions of the single outbound communication stream. In another embodiment, this can be accomplished by the entity sending the portions of the single outbound communication stream, e.g., RAT controller module 218. In an embodiment, verification can include verifying that the packets were received, determining the quality of the transmission (the number of packets dropped, the throughput, QoS attributes, etc.), and determining if a handover can be successfully completed, for example based on the quality of the transmission. For example, where the QoS requirements are low (e.g., internet chat) it may be determined that as long as the packets reached the destination, handover is successful. In other examples, where the QoS requirements are high (e.g., video chat) specific criterion thresholds may need to be met.

In an embodiment, these thresholds can be modified based on other available networks. For example, if a network device is currently using a WiFi connection, and attempts to split a single outbound communication stream to use an LTE connection simultaneously, the QoS requirements can be reduced based on the load that will be handled by the WiFi connection. One or more QoS requirements can be met by the combination of the connections, e.g., bandwidth requirements. In another embodiment, the thresholds are not modified based on other available or used connections. For example, a network device may currently be using a WiFi connection, and attempt to split a single outbound communication stream to use a second WiFi connection simultaneously. When verifying the connection information, the network may not modify one or more of the QoS requirements in view of the original WiFi connection, e.g., QoS latency requirements. In another example, a network device may do this in order to identify and maintain two network connections that each can hand the single outbound communication stream should the other network connection fail or become overloaded.

In step 450, the system can determine whether the synchronization information has been verified and the handover was successful.

If the handover was successful, then the system moves to step 460. The first portion of the single outbound communication stream can be transferred to the first network and the second portion of the single outbound communication stream can be transferred to the second network.

If the handover was not successful, then the system moves to step 470 where the system utilizes a single outbound communication stream.

Example Application

Video Streaming Applications

Video streaming is a very popular application on mobile devices. As more and more users stream videos over wireless network, the bandwidth demands on the network increase. Therefore, techniques to offload portions of video streams are important. The Scalable Video Codec (SVC) and Multiview Video Codec (MVC) are standards utilized to encode a video stream. Both SVC and MVC use layers within the encoded stream. A base layer encodes the lowest representation of the video stream. One or more enhancement layers encode additional information that can be used to reconstruct higher quality, higher resolution versions of the video during the decoding process.

In embodiments of the present disclosure, individual layers of the video stream are handed over in a manner that best fits the characteristics of the current connectivity of the user device. For example, a UE may be served by a first network access device. As the UE roams, one or more additional network access devices may become available. In this embodiment, the controller makes a determination of whether to handover one or more layers of the video stream. For example, a set of layers may be handed over to a network access device while the path through the current network access device is retained for the other layers.

When determining the layers to handover, the controller may consider the relative importance or demands of each underlying layer. That is, the handover process is video content aware. In the case of SVC/MVC handovers, a stream originally comprising all SVC/MVC layers may be split into multiple substreams each including a portion of the SVC/MVC layer information.

Applications that involve video streaming also utilize more power than other applications. In making the decision on whether to handover all or a portion of the video stream, the controller takes into account the power capabilities of the available networks. In terms of power, a WiFi network is preferable to either a 2G or 3G cellular networks because timers to trigger low power mode transitions in 2G/3G are considerably longer than in WiFi networks. An LTE network provides discontinuous reception (DRX) functionality that is network controlled and flexible allowing for both short and long DRX cycles. In some cases, therefore, it may be preferable to switch to LTE rather than use WiFi from a power savings perspective.

The controller may also take into account the type of UE (e.g., Android device, iPhone device, etc.) when making a handover decision. When the UE is in a location such that the UE can access different types of networks (e.g., WiFi and LTE networks), the controller determines whether to handover all or a portion of the video stream to a new network.

For example, the controller may handover all or portions of the video stream from a first network (e.g., WiFi) to LTE if the transmit power consumption is similar for both LTE and WiFi and/or the UE has buffered a sufficient amount of data. For example, Android and iPhone UEs can buffer 100+ seconds of data. In this case, a handover of the stream or a set of substreams can utilize the DRX functionality of LTE to save power.

The controller may also take into account the application being executed and the attributes associated with the application when making a handover decision. For example, if a user is playing a video game and has not subscribed for QoS corresponding to real-time gaming subscription with an LTE operators, the controller may determine to handover or remain on a WiFi network because WiFi power saving mode is better since LTE DRX cycles are very large.

Additional Embodiments

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include non-transitory machine-readable mediums such as read only memory (ROM); random access memory (RAM); magnetic disk storage media; optical storage media; flash memory devices; and others. As another example, the machine-readable medium may include transitory machine-readable medium such as electrical, optical, acoustical, or other forms of propagated signals (e.g., carrier waves, infrared signals, digital signals, etc.). Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A network device comprising:
a memory; and
a processor, coupled to the memory, configured to:
provide a first network communication module and a second network communication module, wherein the first network communication module utilizes a first radio access technology and the second network communication module utilizes a second radio access technology; and
split a user data communication stream into a first portion and a second portion, the first portion to be transmitted across a first radio access technology pathway of a first network using the first network communication module and the second portion to be transmitted across a second radio access technology pathway of a second network using the second network communication module,
wherein the first portion and the second portion are determined based on a power saving mode offered by the first network, the power saving mode resulting in power savings of the first radio access technology relative to the second radio access technology, and
wherein the first and second radio access technologies are different.

2. The network device of claim 1, wherein the processor is further configured to search for available networks.

3. The network device of claim 1, wherein the processor is configured to split the user data communication stream based on a type of data contained in the user data communication stream.

4. The network device of claim 1, wherein the processor is further configured to insert synchronization information into the first portion using the first network communication module.

5. The network device of claim 4, wherein the synchronization information is used to recombine the first and second portions at a destination.

6. The network device of claim 1, wherein the processor is further configured to define the first and second portions based on a first throughput of the first radio access technology pathway and a second throughput of the second radio access technology pathway.

7. The network device of claim 1, wherein the processor is further configured to assign the first and second portions to the first radio access technology pathway and the second radio access technology pathway based on the first radio access technology and the second radio access technology.

8. The network device of claim 1, wherein the processor is further configured to assign the first and second portions to the first radio access technology pathway and the second radio access pathway based on priority of first data included in the first portion and second data included in the second portion.

9. A method for splitting an outbound communication stream in a wireless device supporting a first radio access technology and a second radio access technology, comprising:

detecting a first network of the first radio access technology and a second network of the second radio access technology;

splitting a user data communication stream into a first substream and a second substream, the first substream to be transmitted over the first network and the second substream to be transmitted over the second network, wherein the first substream and the second substream are determined based on a power saving mode offered by the first network, the power saving mode resulting in power savings of the first radio access technology relative to the second radio access technology; and transmitting the first substream over the first network and the second substream over the second network, and wherein the first and second radio access technologies are different.

10. The method of claim 9, wherein splitting the user data communication stream includes splitting the user data communication stream based on respective throughputs of the first and second networks.

11. The method of claim 9, further comprising inserting synchronization information into the first substream.

12. The method of claim 9, wherein splitting the user data communication stream comprises splitting the user data communication stream based on a type of data contained in the user data communication stream.

13. The method of claim 11, wherein the synchronization information is used to recombine the first and second substreams at a destination.

14. The method of claim 9, further comprising:
assigning the first and second substreams to the first and second networks based on priority of first data included in the first substream and second data included in the second substream.

15. A network device comprising:
a memory; and
a processor, coupled to the memory, configured to:
provide a first network communication module and a second network communication module, wherein the first network communication module utilizes a first radio access technology over a first network and the second network communication module utilizes a second radio access technology over a second network;
split a user data communication stream into a first portion and a second portion; and
assign the first and second portions to the first and second network communication modules for transmission based on priority of first data contained in the first portion and second data contained in the second portion and based on a power saving mode offered by the first network, the power saving mode resulting in power savings of the first radio access technology relative to the second radio access technology,
wherein the first and second radio access technologies are different.

16. The network device of claim 15, wherein the processor is configured to split the user data communication stream based on a type of data contained in the user data communication stream.

17. The network device of claim 15, wherein the processor is further configured to assign the first and second portions to the first and second network communication modules based on a first throughput of the first radio access technology and a second throughput of the second radio access technology.

18. The network device of claim 15, wherein the processor is further configured to insert synchronization information into the first portion.

* * * * *